United States Patent [19]

Yang et al.

[11] Patent Number: 5,196,763
[45] Date of Patent: Mar. 23, 1993

[54] MIXED GREEN LIGHT-EMITTING PHOSPHOR, AND A CATHODE RAY TUBE USING THIS PHOSPHOR

[75] Inventors: Joon-Mo Yang, Suwon; Min-Soo Kim, Seoul; Woo-Chan Kim, Suwon, all of Rep. of Korea

[73] Assignee: Samsung Electron Devices Co., Ltd., Hwasung-Kun, Rep. of Korea

[21] Appl. No.: 697,967

[22] Filed: May 10, 1991

[30] Foreign Application Priority Data

May 11, 1990 [KR] Rep. of Korea ............ 90-6751

[51] Int. Cl.$^5$ ............................................ H01J 29/20
[52] U.S. Cl. .................................... 313/468; 313/467; 252/301.4 R; 252/301.4 H
[58] Field of Search ................ 313/467, 468; 252/301.4 R, 301.4 H

[56] References Cited

U.S. PATENT DOCUMENTS 3,579,016  5/1971  Palilla ............................ 313/468
4,924,139  5/1990  Movida et al. ............ 252/301.4 R Primary Examiner—Donald J. Yusko
Assistant Examiner—N. D. Patel
Attorney, Agent, or Firm—Cushman, Darby & Cushman

[57] ABSTRACT

A mixed green light-emitting phosphor for a fluorescent screen of a projection cathode ray tube is prepared by mixing LaOCl phosphor activated with Tb with at least a mixture of phosphors selected from the group of a $Y_3(Al,Ga)_5O_{12}$ phosphor activated with Tb and a $Zn_2SiO_4$ phosphor activated with Mn, a $Y_3(Al,Ga)_5O_{12}$ phosphor activated with Tb and a $InBo_3$ phosphor activated with Tb, or a $InBO_3$ phosphor activated with Tb and a $Zn_2SiO_4$ phosphor activated with Mn. The fluorescent screen of the cathode ray tube is tested under standard drive conditions. From the test results, it is noted that the characteristics of the brightness and the C.I.E. coordinates of the fluorescent screen using the mixed green light-emitting phosphors is remarkably improved compared with that of the conventional $Y_3Al_5O_{12}$ phosphor activated with Tb.

5 Claims, 3 Drawing Sheets

MIXED GREEN LIGHT-EMITTING PHOSPHOR, AND A CATHODE RAY TUBE USING THIS PHOSPHOR

BACKGROUND OF THE INVENTION

1. Field of the Invention

This invention relates to a green light-emitting phosphor for a projection cathode ray tube, more particularly to a mixed green light-emitting phosphor prepared by mixing a plurality of green light-emitting phosphors with a predetermined weight ratio, to improve the brightness and the color tone of the fluorescent screen of the projection cathode ray tube.

Description of the Prior Arts

Conventionally, typical green light-emitting phosphors for projection cathode ray tubes are $Y_3Al_5O_{12}$:Tb and $Y_3(Al,Ga)_5O_{12}$:Tb, which have excellent characteristics in persistence and brightness saturation but have inferior characteristics in brightness and chromaticity. Another prior green light-emitting phosphor used for projection cathode ray tubes is LaOCl:Tb, which has not good saturation characteristics of temperature and chromaticity in the range of high current.

It is desirable that a green light-emitting phosphor for projection cathode ray tubes must have a feature of high brightness from the range of low current to high current, excellent saturation characteristics of brightness in the high current range, and a longevity of afterglow characteristics. To this end, recently a mixture of phosphors having unique characteristics, with a predetermined weight ratio has been used to compensate for a respective disadvantages therebetween, so as to improve various characteristics of the phosphors applicable to the fluorescent screen.

For instance, Japanese Patent Laid-Open, SHOWA 63-381 discloses a mixture of green light-emitting phosphors consisting of a red phosphor $P_{27}$, $Zn_3(PO_4)_2$:Mn and a green phosphor $P_1$, $Zn_2SiO_4$:Mn to make an orange color fluorescent screen for cathode ray tube, which can enhance the characteristics of long afterglow.

Another Japanese Patent Laid-Open, HEISEI 1-215884 discloses a mixture of green light-emitting phosphors consisting of a LaOCl:Tb phosphor and a $Y_2SiO_2$:Tb, phosphor having a predetermined mean particle diameter which phosphors are mixed with a selective weight ratio. This Japanese patent document sets forth a green phosphor which can improve brightness of an image projected on the screen under excitation by an electron beam from low current to high current range resulting from the compensation of respective characteristics of each phosphor.

Japanese Patent Laid-Open HEISEI 1-284584 discloses a luminescent element for a color display CRT which is a light blue or a white phosphor created by mixing a ZnS phosphor activated with Cu, Au, or Al and a $Y_2O_2S$ phosphor activated with Eu by adding a ZnS phosphor activated with Ag, a $Y_2O_2S$ phosphor activated with Tb, or a $Gd_2O_2S$ phosphor activated with Tb in a predetermined weight ratio. Such mixture of phosphors provides the same color tone at a low current and at a high current and improves the brightness at a high current density.

However, above Japanese Patent Laid-Open SHOWA 63-381 and HEISEI 1-284584 relate to a mixture of phosphors for fluorescent screen having an orange color, a light blue color, or a white color. Japanese Patent Laid-Open HEISEI 1-215884 concerns a mixture of phosphors for fluorescent screen consisting of LaOCl activated with Tb and $Y_2SiO_5$ activated with Tb, which only discloses an improvement of the brightness over all of the range of current without providing various luminescent characteristics of the mixture of each phosphor.

SUMMARY OF THE INVENTION

It is an object of the present invention to provide a mixture of green light-emitting phosphors and a cathode ray tube using that mixture which can enhance the characteristics of the brightness and the color tone of the fluorescent screen by mixing a plurality of phosphors with a predetermined weight ratio.

To accomplish above object, a mixture of green light-emitting phosphors in accordance with the present invention is prepared by mixing a LaOCl:Tb phosphor with at least a selective mixture selected from the group consisting of a $Y_3(Al,Ga)_5O_{12}$:Tb phosphor and a $Zn_2SiO_4$:Mn phosphor, a $Y_3(Al,Ga)_5O_{12}$:Tb phosphor and a $InBO_3$:Tb phosphor, or a $InBO_3$:Tb phosphor and a $Zn_2SiO_4$:Mn phosphor at a predetermined weight ratio. Such mixture of phosphors in accordance with the present invention can improve the brightness and color tone of the fluorescent screen of the CRT.

BRIEF DESCRIPTION OF THE DRAWINGS

The above and other objects, features and advantages of the present invention will be more fully appreciated from the following detailed description of illustrative embodiments thereof where taken in conjunction with the accompanying drawings, in which.

DETAILED DESCRIPTION OF THE PREFERRED EMBODIMENTS

Methods for making respective green light-emitting phosphors used for the present invention will first be described, as follows:

(1) A Method of Making a LaOCl Phosphor Activated with Tb;

$La_2O_3$, $NH_4Cl$ and $Tb_4O_7$ as starting materials, are uniformly mixed together and fired at a temperature in the range of 400° C. to 500° C., with 450° C. being preferred, for an hour. Then, such mixture is refired in the range of 1050° C. to 1150° C., with 1100° C. being preferred, for approximately 2 hours, leached with water, and dried to make LaOCl phosphor activated with Tb. The characteristics of the LaOCl:Tb phosphor prepared as above are shown in Table 1.

(2) A Method of Making a $Y_3(Al,Ga)_5O_{12}$ Phosphor Activated with Tb;

$Y_2O_3$, $Al_2O_3$, $Ga_2O_3$ and $Tb_4O_7$ as starting materials, are sufficiently mixed together with $BaF_2$ of $BaCl_2$ as a flux and then placed in a refractory crucible. The mixture is fired at a temperature in the range of 1450° C. to 1550° C. for 1 hour to 3 hours, washed with water, and dried to make $Y_3(Al,Ga)_5O_{12}$ phosphor activated with Tb. The characteristics of the $Y_3(Al,Ga)_5O_{12}$:Tb phosphor prepared as above are shown in Table 1.

(3) A Method of Making a $Zn_2SiO_4$ Phosphor Activated with Mn

ZnO, $SiO_2$ and $MnSO_4$ as starting materials, are dipped in the $NH_4OH$ solution and them dried. The mixture is fired at a temperature in the range of 1250° C. to 1300° C. for 1 hour to 2 hours to make $Zn_2SiO_4$ phosphor activated with Mn. The characteristics of the $Zn_2SiO_4$:Mn phosphor prepared as above are shown in Table 1.

(4) A Method of Making an $InBo_3$ Phosphor Activated with Tb;

$InBO_3$, $H_3BO_3$, and $Tb_4O_7$ as starting materials, are sufficiently blended and then fired at a temperature in the range of 1350° C. to 1450° C., with 1400° C. being preferred, for 3 hours. The mixture is washed with water to make the $InBO_3$ phosphor activated with Tb. The characteristics of the $InBO_3$:Tb phosphor prepared as above are shown in Table 1.

and then we checked the characteristics of the mixture such as brightness and C.I.E. coordinates. We obtained the results as shown in Table 2.

Figure 1:
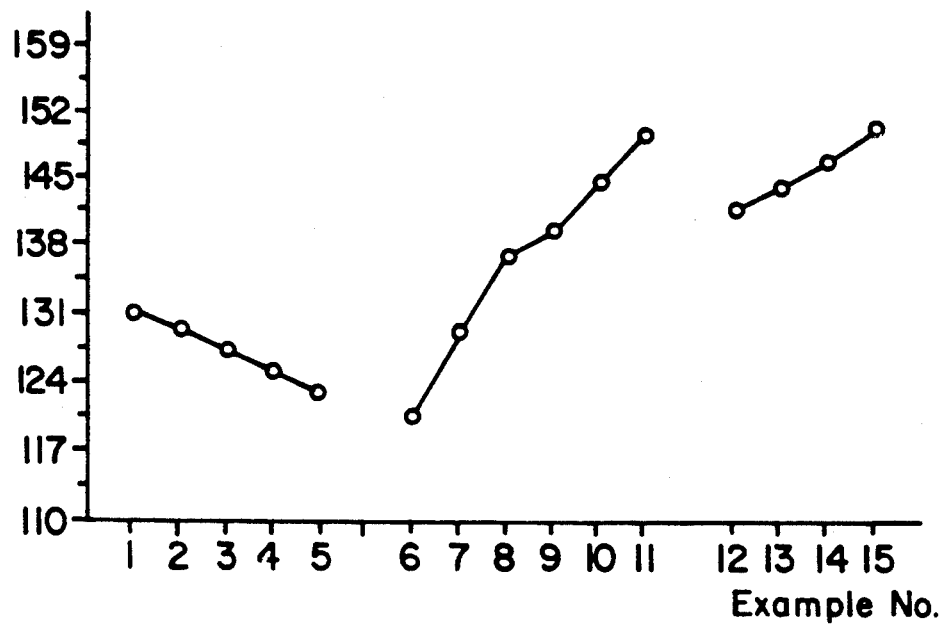
FIG. 1 is a graph showing brightness changes in accordance with respective embodiments of the present invention.
Figure 2:
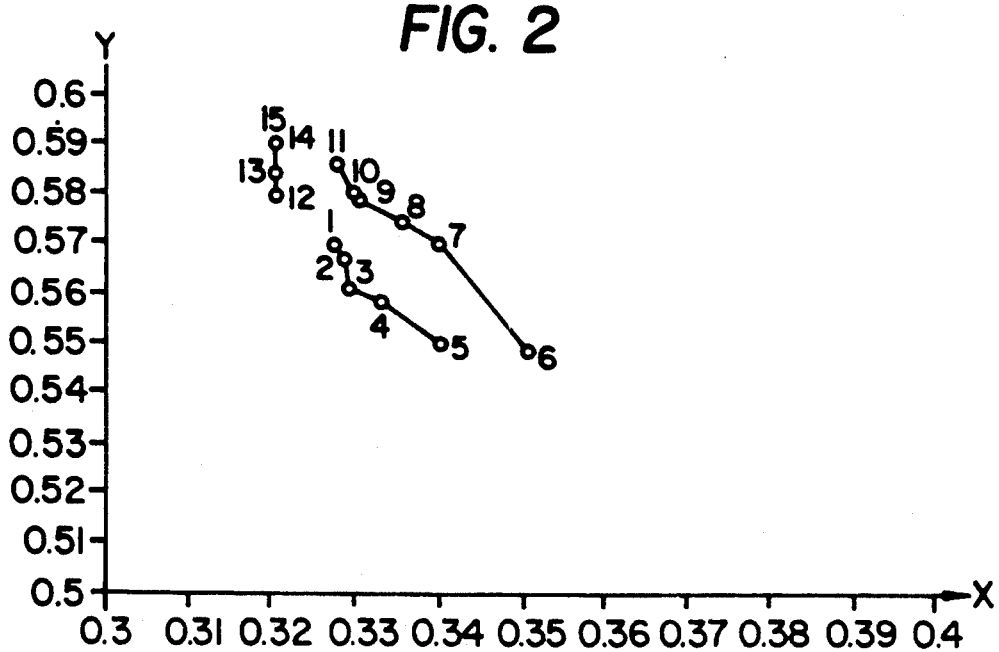
FIG. 2 is a graph showing a C.I.E. chromaticity coordinate in accordance with respective embodiment of the present invention.

FIG. 1 and FIG. 2 show brightness changes and C.I.E. coordinates according to the respective embodiments of the present invention, where the mixture of phosphors is prepared using the respective weight ratios specified in specified weight ratio at Table 2. In FIG. 1 and FIG. 2, each plot point number denotes a respective Example Number of the disclosed embodiments of the present invention.

Figure 3:
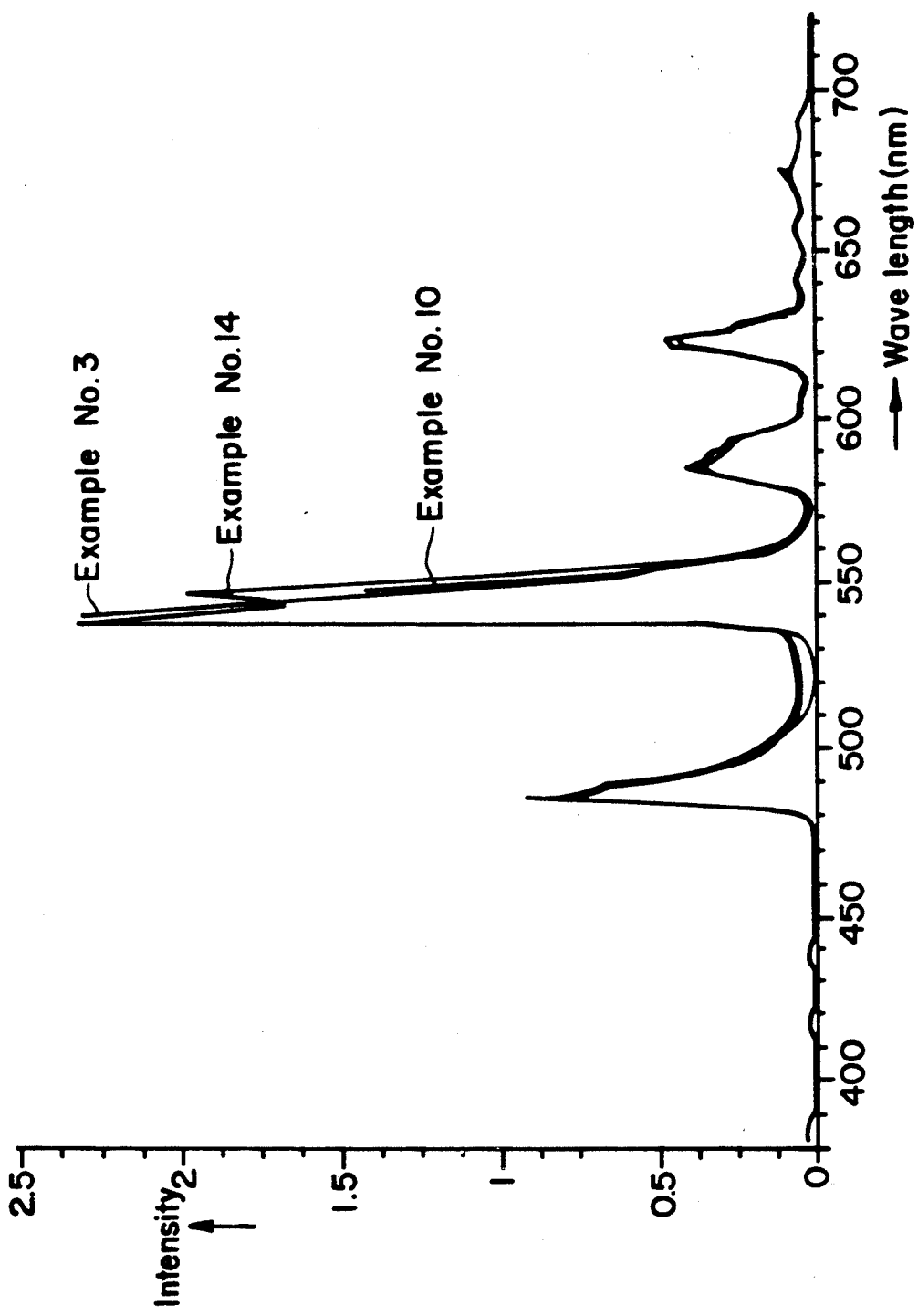
FIG. 3 is a luminescent spectrum chart illustrating several embodiments of the present invention.
Figure 4:
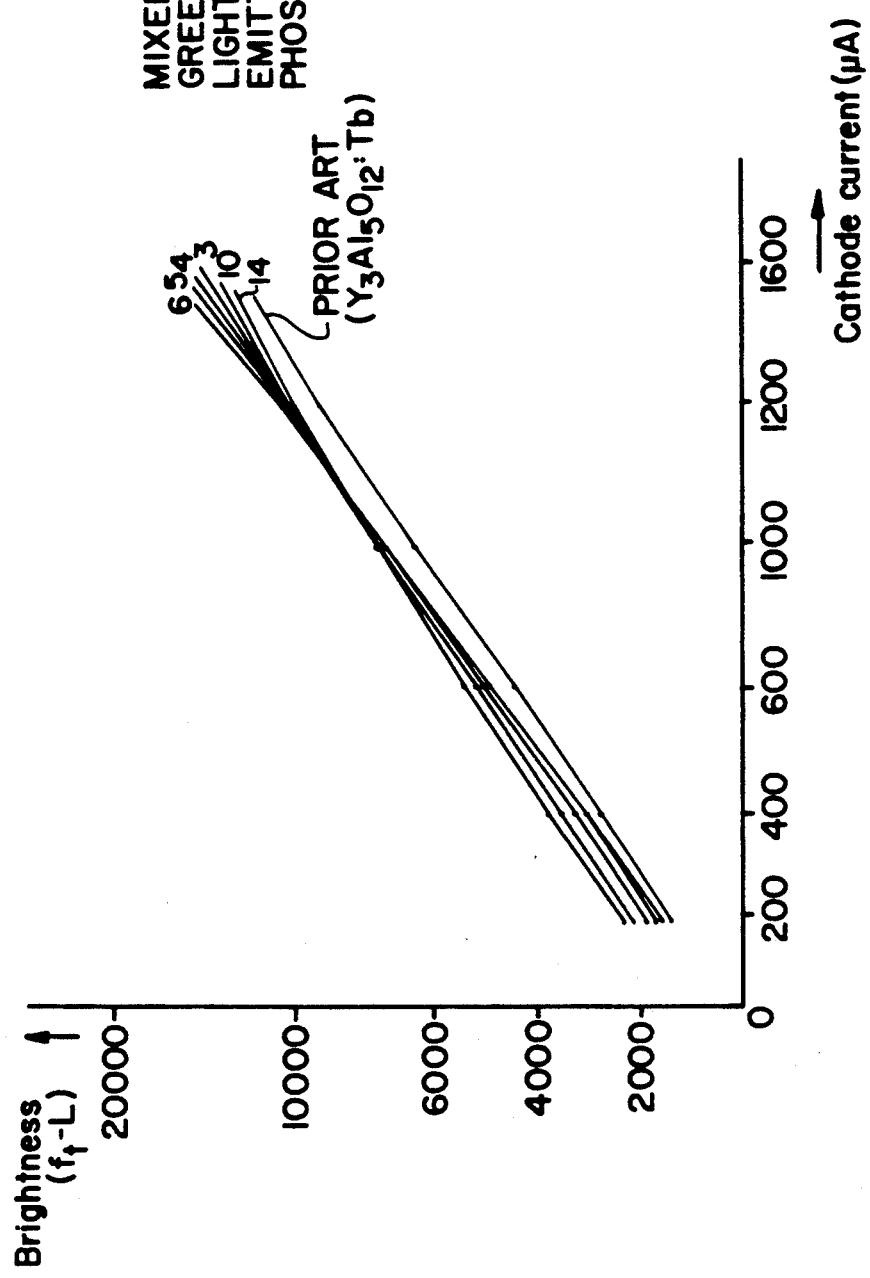
FIG. 4 is a graph showing the characteristics of the cathode current versus brightness saturation of the present invention compared with prior art.
Figure 5:
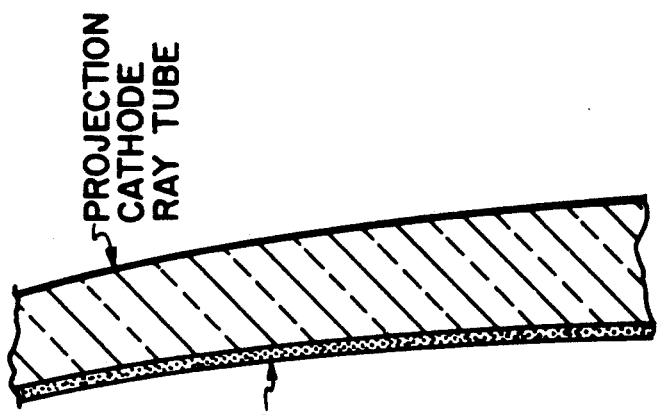
FIG. 5 is a schematic fragmentary cross-sectional view of a projection CRT having a mixed green light-emitting phosphor applied on the fluorescent screen thereof in accordance with the principles of the present invention.

FIG. 3 shows a luminescent spectrum chart of Examples 3, 10 and 14 in accordance with present invention. FIG. 4 shows the characteristics of the cathode current versus brightness of the projection cathode ray tube using a mixed phosphor in accordance with respective embodiments of the present invention, in which data are obtained by testing the projection CRT under the standard driving conditions of 29 KV and 400 $\mu$A.

As indicated in Table 2, and FIG. 1 through FIG. 4, the mixture of phosphors consisting of LaOCl:Tb, $P_{53}$(Ga), and $P_1$ has poorer afterglow characteristics with increasing the quantity of the $P_1$ phosphor.

If we set the mixing quantity of $P_1$ phosphor less than 5 weight percent, the characteristics of the brightness and the color tone of the mixed phosphor becomes poor, but that of the brightness saturation is improved. Therefore, the mixing quantity of each phosphor which can satisfy both the characteristics of color tone and brightness is, 5 weight percent of $P_1$ and 20 to 70 weight percent of LaOCl:Tb, with 30 to 50 weight percent of

TABLE 1

| | Comparison of the characteristics of respective phosphors. | | | | | | |
|---|---|---|---|---|---|---|---|
| | Brightness | color tone | Afterglow | Brightness saturation | Temperature | longevity | spectrum distribution |
| $Y_3Al_5O_{12}$:Tb | ▲ | ▲ | ○ | ▲ | □ | □ | ○ |
| $Y_3(Al, Ga)_5O_{12}$:Tb | ○ | ▲ | ○ | □ | ○ | ○ | ○ |
| LaOCl:Tb | ○ | ▲ | ○ | ○ | ▲ | ○ | ○ |
| $InBO_3$:Tb | ○ | ○ | ▲ | ▲ | ○ | ○ | ○ |
| $Zn_2SiO_4$:Mn | ○ | □ | X | ▲ | ○ | ▲ | □ |

In Table 1, □ means very excellent, ○ means good, ▲ means not good (but applicable), and × means very bad (unapplicable), respectively.

As shown from Table 1, it is noted that each phosphor has its own characteristics such as brightness, color tone and the like. Accordingly, we have prepared mixtures of phosphors by mixing a respective phosphor with a predetermined weight ratio according to the following embodiments:

Firstly, we blended LaOCl:Tb phosphor having a poor color tone with $Zn_2SiO_4$:Mn phosphor (referred to as $P_1$ phosphor hereinafter) having a good color tone with a specified weight ratio, indicated in Table 2, to prepare a mixture of phosphors. And then we checked the characteristics of the mixture such as brightness and C.I.E. coordinate, whereby we obtained the results as shown in Table 2.

Secondly, we blended LaOCl:Tb phosphor with $Y_3$-$(Al,Ga)_5O_{12}$:Tb phosphor (referred to as $P_{53}$(Ga) phosphor hereinafter) having a good color tone, with a specified weight ratio, indicated in Table 2 to prepare a mixture of phosphors, and then we checked the brightness characteristics. We obtained the results as shown in Table 2.

Thirdly, we blended LaOCl:Tb phosphor with $InBO_3$:Tb and $P_1$ phosphor, with a specified weight ratio, indicated in Table 2, to prepare a mixture of phosphors, LaOCl:Tb being optimal.

The characteristics of the mixture of phosphors consisting of LaOCl:Tb, $P_{53}$ (Ga), and $InBO_3$:Tb in accordance with various mixing ratio are as follows: the brightness and color tone is improved with decreasing the quantity of $P_{53}$ (Ga) where the quantity of the $InBO_3$:Tb phosphor is constant. Here, although the brightness and color tone of the mixed phosphors are improved with increasing the quantity of $InBO_3$:Tb, the afterglow characteristic becomes poor if the quantity of $InBO_3$:Tb is surplus. Accordingly, it is noted that applicable mixing quantity of each phosphor is as follows: less than 30 weight percent of $InBO_3$:Tb phosphor and 10 to 50 weight percent of LaOCl:Tb, with 20 to 40 weight percent of LaOCl:Tb being desirable.

The characteristics of the mixture of phosphors consisting of LaOCl:Tb, $InBO_3$:Tb, and $P_1$ phosphor in accordance with mixing ratio are as follows: the brightness and color tone are improved with increasing the quantity of $InBO_3$:Tb phosphor in case of the quantity of the $P_1$ phosphor being constant, but the afterglow characteristic becomes poor if $InBO_3$:Tb phosphor is surplus. Therefore, it is desirable the quantity of $P_1$ phosphor is less than 5 weight percent and that of $InBO_3$:Tb phosphor is less than 30 weight percent, and more particularly, in case of 5 weight percent of $P_1$ phosphor, 20 to 30 weight percent of $InBO_3$:Tb phosphor and 65 to 75 weight percent of LaOCl:Tb phosphor will be more desirable.

Now, we will describe respective embodiments of the present invention, as applied to a projection cathode ray tube with reference to mixing rate of each phosphor indicated in Table 2.

EXAMPLE 1

$La_2O_3$, $NH_4Cl$, and $Tb_4O$ as the starting materials are uniformly blended using a ball mill, and fired, then washed with water and the solution is evaporated to dryness, whereby we obtain LaOCl:Tb phosphor. The fluorescent screen of a cathode ray tube is formed by using LaOCl:Tb phosphor prepared as above, and testing for relative brightness and C.I.E. coordinates is performed under standard drive conditions of 29 KV and 400 μA.

Test results as shown in Table 2 are, obtained providing that the brightness of conventional $Y_3Al_5O_{12}$:Tb phosphor is set to be 100 percent of brightness. The brightness characteristics of LaOCl:Tb phosphor given in Example 1 is improved by 31.2 percent compared with that of conventional $P_{53}$(Ga) phosphor, and C.I.E. coordinates are approximately $X=0.3274$, $Y=0.5697$, which illustrates improvement of color tone.

EXAMPLE 2

70 weight percent of LaOCl:Tb phosphor as prepared in Example 1, 25 weight percent of $Y_3(Al,Ga)_5O_{12}$:Tb phosphor, and 5 weight percent of $Zn_2SiO_4$:Mn phosphor are sufficiently blended using a ball mill to make a mixed green light-emitting phosphor. The fluorescent screen of the cathode ray tube is formed by using these mixed phosphors and the characteristics of the brightness and the color tone of the fluorescent screen are tested under the standard drive conditions as in Example 1. The test results, as indicated in Table 2, show that the brightness of the mixed phosphors according to Example 2 is improved by 29.5 percent compared with that of the conventional $P_{53}$ (Ga) phosphor, and C.I.E. coordinates are $X=0.3284$, $Y=0.5674$.

EXAMPLE 3

We prepare a mixed phosphor as in Example 2, except that 50 weight percent of LaOCl:Tb is blended with 45 weight percent of $Y_3(Al,Ga)_5O_{12}$:Tb. After forming the fluorescent screen of the cathode ray tube by using these mixed phosphors, the characteristics of the brightness and the color tone thereof are checked under the standard drive conditions as in Example 1. The test results are indicated in Table 2, and the cathode current versus the brightness saturation characteristic is shown at FIG. 4.

EXAMPLE 4

We prepare a mixed phosphor as in Example 2, except that 30 weight percent of LaOCl:Tb is blended with 65 weight percent of $Y_3(Al,Ga)_5O_{12}$:Tb. After forming the fluorescent screen of the cathode ray tube by using these mixed phosphors, the characteristics of the brightness and the color tone thereof are checked under the standard drive conditions as in Example 1. The test results are indicated in Table 2.

EXAMPLE 5

We prepare a mixed phosphor as in Example 2, except that 10 weight percent of LaOCl:Tb is blended with 85 weight percent of $Y_3(Al,Ga)_5O_{12}$:Tb. After forming the fluorescent screen of the cathode ray tube by using these mixed phosphors, the characteristics of the brightness and the color tone thereof are checked under the standard drive conditions as in Example 1. The test results are indicated in Table 2.

EXAMPLE 6

$Y_2O_3$, $Al_2O_3$, $Ga_2O_3$, and $Tb_4O_7$ as the starting materials are sufficiently blended together with appropriate amounts of $BaF_2$ or $BaCl_2$ as a flux using a ball mill. The mixture is fired at a temperature in the range of 1450° C. to 1550° C. for 1 hour to 3 hours, washed with water, and dried to make $Y_3(Al,Ga)_5O_{12}$ phosphor activated with Tb. After forming the fluorescent screen of the cathode ray tube by using these mixed phosphors, the characteristics of the brightness and the color tone thereof are checked under the standard drive conditions as in Example 1. The test results are indicated in Table 2.

EXAMPLE 7

We prepare a mixed phosphor as in Example 2, except that 20 weight percent of LaOCl:Tb is blended with 70 weight percent of $Y_3(Al,Ga)_5O_{12}$:Tb and 10 weight percent of InBO:Tb. After forming the fluorescent screen of the cathode ray tube by using these mixed phosphors, the characteristics of the brightness and the color tone thereof are checked under the standard drive conditions as in Example 1. The test results are indicated in Table 2.

EXAMPLE 8

We prepare a mixed phosphor as in Example 7, except that 40 weight percent of LaOCl:Tb is blended with 50 weight percent of Y(Al,Ga) O:Tb. After forming the fluorescent screen of the cathode ray tube by using these mixed phosphors, the characteristics of the brightness and the color tone thereof are checked under the standard drive conditions as in Example 1. The test results are indicated in Table 2.

EXAMPLE 9

We prepare a mixed phosphor as in Example 7, except that 60 weight percent of LaOCl:Tb is blended with 30 weight percent of $Y_3(Al,Ga)_5O_{12}$:Tb. After forming the fluorescent screen of the cathode ray tube by using these mixed phosphors, the characteristics of the brightness and the color tone thereof are checked under the standard drive conditions as in Example 1. The rest results are indicated in Table 2.

EXAMPLE 10

40 weight percent of LaOCl:Tb phosphor as prepared in Example 1, 40 weight percent of $Y_3(Al,Ga)_5O_{12}$:Tb phosphor, and 20 weight percent of $InBO_3$:Tb phosphor are sufficiently blended using a ball mill, to make mixed green light-emitting phosphors. The fluorescent screen of the cathode ray tube is formed by using these mixed phosphors and the characteristics of the brightness and the color tone of the fluorescent screen are tested under the standard drive conditions as in Example 1. The test results, as indicated in Table 2, show that the brightness of the mixed phosphors according to Example 10 is improved by 44.3 percent compared with that of the conventional P (GA) phosphor, and C.I.E. coordinates are X=0.3296, Y=0.5804.

EXAMPLE 11

50 weight percent of LaOCl:Tb phosphor as prepared in Example 1, 20 weight percent of $Y_3(Al,Ga)_5O_{12}$:Tb phosphor, and 30 weight percent of $InBO_3$:Tb phosphor are blended using a ball mill, to make mixed green light-emitting phosphors. The fluorescent screen of the cathode ray tube is formed by using these mixed phosphors, and the characteristics of the brightness and the color tone of the fluorescent screen are tested under the standard drive conditions as in Example 1. The test results are indicated in Table 2.

EXAMPLE 15

60 weight percent of LaOCl:Tb phosphor as prepared in Example 1, 35 weight percent of $InBO_3$:Tb phosphor, and 5 weight percent of $Zn_2SiO_4$:Mn phosphor are blended using a ball mill, to make mixed green light-emitting phosphors. The fluorescent screen of the cathode ray tube is formed by using these mixed phosphors, and the characteristics of the brightness and the color tone of the fluorescent screen are tested under the standard drive conditions as in Example 1. The test results are indicated in Table 2.

TABLE 2

The characteristics of the brightness and the color tone of the fluorescent screen in accordance with the mixing ratios used in the respective embodiments.

| Example No. | Mixing rate by weight (%) | | | | bright-ness (%) | C.I.E. Coordinate | |
|---|---|---|---|---|---|---|---|
| | LaOCl:Tb | $Y_3$(Al, Ga)$_5O_{12}$:Tb | $InBO_3$:Tb | $Zn_2SiO_4$:Mn | | X | Y |
| 1 | 100 | 0 | 0 | 0 | 131.2 | 0.3214 | 0.5697 |
| 2 | 70 | 25 | 0 | 5 | 129.5 | 0.3284 | 0.5674 |
| 3 | 50 | 45 | 0 | 5 | 127.4 | 0.3294 | 0.5616 |
| 4 | 30 | 65 | 0 | 5 | 125.1 | 0.3331 | 0.5587 |
| 5 | 10 | 85 | 0 | 5 | 123.1 | 0.3401 | 0.5501 |
| 6 | 0 | 100 | 0 | 0 | 120.4 | 0.3504 | 0.5487 |
| 7 | 20 | 70 | 10 | 0 | 129.4 | 0.3397 | 0.5704 |
| 8 | 40 | 50 | 10 | 0 | 136.7 | 0.3354 | 0.5745 |
| 9 | 60 | 30 | 10 | 0 | 139.4 | 0.3302 | 0.5794 |
| 10 | 40 | 40 | 20 | 0 | 144.3 | 0.3296 | 0.5804 |
| 11 | 50 | 20 | 30 | 0 | 149.6 | 0.3276 | 0.5861 |
| 12 | 90 | 0 | 5 | 5 | 141.7 | 0.3204 | 0.5802 |
| 13 | 80 | 0 | 15 | 5 | 143.9 | 0.3201 | 0.5841 |
| 14 | 70 | 0 | 25 | 5 | 146.7 | 0.2103 | 0.5897 |
| 15 | 60 | 0 | 35 | 5 | 150.3 | 0.3205 | 0.5901 |

EXAMPLE 12

90 weight percent of LaOCl:Tb phosphor as prepared in Example 1, 5 weight percent of $InBO_3$:Tb phosphor, and 5 weight percent of $Zn_2SiO_4$:Mn phosphor are blended using a ball mill, to make mixed green light-emitting phosphors. The fluorescent screen of the cathode ray tube is formed by using these mixed phosphors, and the characteristics of the brightness and the color tone of the fluorescent screen are tested under the standard drive conditions as in Example 1. The test results are indicated in Table 2.

EXAMPLE 13

80 weight percent of LaOCl:Tb phosphor as prepared in Example 1, 15 weight percent of $InBO_3$: Tb phosphor, and 5 weight percent of $Zn_2SiO_4$:Mn phosphor are blended using a ball mill, to make mixed green light-emitting phosphors. The fluorescent screen of the cathode ray tube is formed by using these mixed phosphors, and the characteristics of the brightness and the color tone of the fluorescent screen are tested under the standard drive conditions as in Example 1. The test results are indicated in Table 2.

EXAMPLE 14

70 weight percent of LaOCl:Tb phosphor as prepared in Example 1, 25 weight percent of $InBO_3$:Tb phosphor, and 5 weight percent of $Zn_2SiO_4$:Mn phosphor are blended using a ball mill to make mixed green light-emitting phosphors. The fluorescent screen of the cathode ray tube is formed by using these mixed phosphors, and the characteristics of the brightness and the color tone of the fluorescent screen are tested under the standard drive conditions as in Example 1. The test results are indicated in Table 2.

In Table 2, the brightness is calculated using as a basis that conventional $Y_3Al_5O_{12}$ activated with Tb is 100 percent.)

As described above, a mixed green light-emitting phosphor in accordance with the present invention is prepared by mixing a LaOCl:Tb phosphor with at least a selective mixture in the group of a $Y_3(Al,Ga)_5O_{12}$:Tb phosphor and a $Zn_2SiO_4$:Mn phosphor, a $Y_3(Al,Ga)_5O_{12}$:Tb phosphor and a $InBO_3$:Tb phosphor, or a $InBO_3$:Tb phosphor and a $Zn_2SiO_4$:Mn phosphor at a specified weight ratio. The fluorescent screen of the cathode ray tube is formed by using these mixed phosphors. It will be appreciated that the mixed phosphor in accordance with the present invention advantageously and remarkably improves the characteristics of the brightness and the color tone of the fluorescent screen under excitation by electron beam compared with the conventional $Y_3Al_5O_{12}$ activated with Tb.

What is claimed is:

1. A mixed green light-emitting phosphor for a projection cathode ray tube, consisting of:
   a mixture having a predetermined weight ratio of:
   (a) LaOCl phosphor activated with Tb; and
   (b) at least two phosphors selected from the group consisting of:
   (i) $Y_3(Al,Ga)_5O_{12}$ activated with Tb,
   (i) $Y_3(Al,Ga)_5O_{12}$ activated with Tb,
   (ii) $Zn_2SiO_4$ activated with Mn, and
   (iii) $InBO_3$ activated with Tb.

2. The mixed green light-emitting phosphor of claim 1, wherein:
   said predetermined weight ratio is 10 to 70 percent
   LaOCl activated with Tb: less than 5 percent $Zn_2SiO_4$ activated with Mn: balance $Y_3(Al,Ga)_5O_{12}$ activated with Tb.

3. The mixed green light-emitting phosphor of claim 1, wherein:
said predetermined weight ratio is 20 to 60 percent LaOCl activated with Tb: less than 30 percent $InBO_3$ activated with Tb: balance $Y_3(Al,Ga)_5O_{12}$ activated with Tb.

4. The mixed green light-emitting phosphor of claim 1, wherein:
said predetermined weight ratio is 60 to 90 percent LaOCl activated with Tb: 5 to 35 percent $InBO_3$ activated with Tb: less than 5 percent $Zn_2SiO_4$ activated with Mn.

5. A projection cathode ray tube comprising:
a tube having a fluorescent screen made of a mixed green light-emitting phosphor consisting of a mixture having a predetermined weight ratio of:
(a) LaOCl phosphor activated with Tb; and
(b) at least two phosphors selected from the group consisting of:
  (i) $Y_3(Al,Ga)_5O_{12}$ activated with Tb,
  (ii) $Zn_2SiO_4$ activated with Mn, and
  (iii) $InBO_3$ activated with Tb. h

* * * * *